Oct. 6, 1959  F. A. ANETSBERGER ET AL  2,907,659
FRENCH FRYING POTATOES AND IMPROVED APPARATUS THEREFOR
Filed Aug. 2, 1956
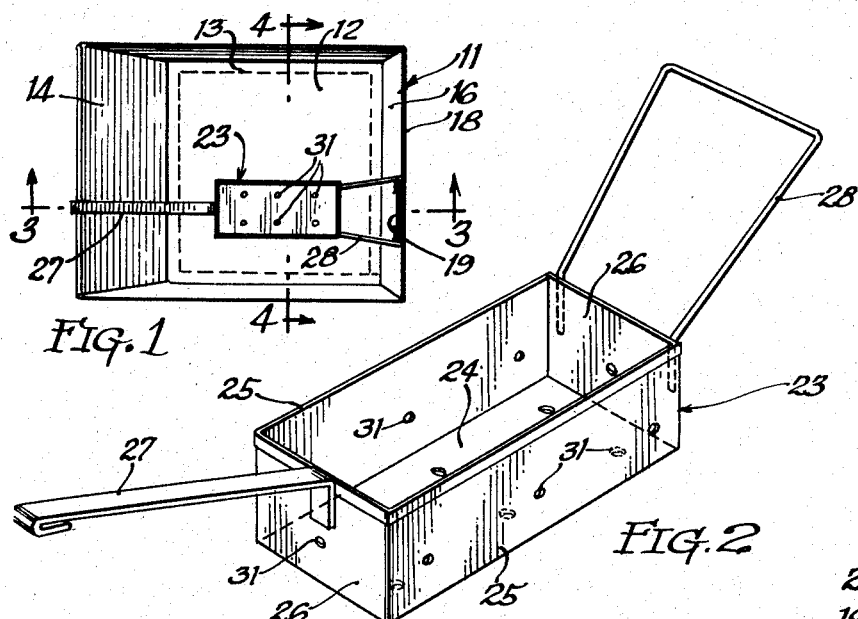
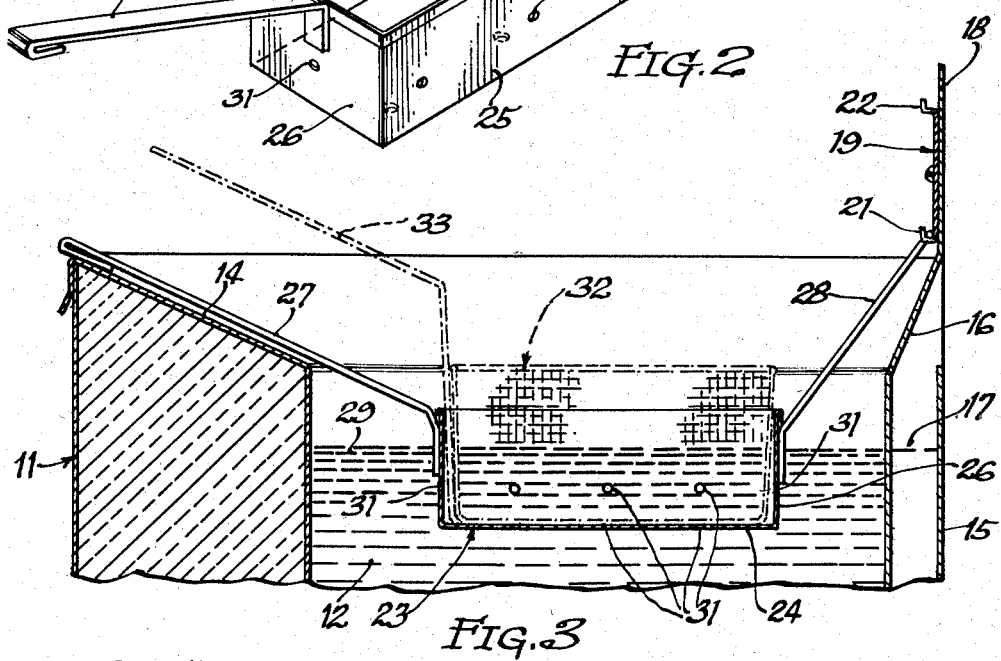
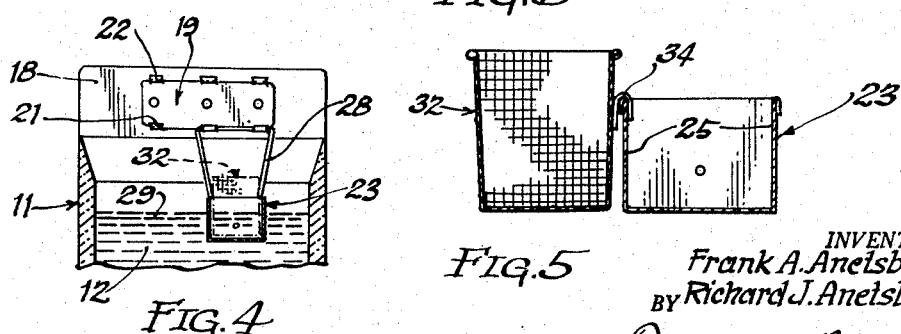
INVENTORS
Frank A. Anetsberger
Richard J. Anetsberger
BY Davis and Brugman
Attorneys

United States Patent Office 2,907,659
Patented Oct. 6, 1959

2,907,659

FRENCH FRYING POTATOES AND IMPROVED APPARATUS THEREFOR

Frank A. Anetsberger and Richard J. Anetsberger, Northbrook, Ill., assignors to Anetsberger Brothers, Inc., Northbrook, Ill., a corporation of Illinois Application August 2, 1956, Serial No. 601,796

11 Claims. (Cl. 99—100)

This invention relates in general to deep fat frying, and more particularly to the production of French fried potatoes.

French frying of potatoes has been fairly well standardized commercially to a formula of a volume ratio of potatoes to fat of approximately 1:6, an initial cooking fat temperature range of from 350° to 375° F., and a frying time of approximately six minutes. While satisfactory results are obtained under such conditions, the restaurant cook has encountered difficulties when the sale or demand is not equivalent to the normal capacity of his equipment, and particularly during periods of light or small demand, when he may find no use within a reasonable time period for a normal full load. In attempting to solve such difficulties, the practice sometimes is indulged of precooking or blanching the potatoes for approximately four minutes, and subsequently completing or recooking for one or two minutes, as orders are received. The resulting French fries are limp, soggy, grease-soaked, and wholly unsatisfactory to a discerning palate. The only other known solution heretofore has been to fry only enough potatoes to fill the short orders as received, that is, to cook that quantity of potatoes ordered even though it may be very considerably less than a capacity or normal load for the equipment. The resulting French fries also are completely unsatisfactory, since they will be too well cooked on the outside and not cooked at the center.

A principal object of this invention, therefore, is to solve the above difficulties and to produce French fried potatoes of unqualified excellence.

Another important object is to enable the restaurant cook to make use of his present equipment in filling short orders for French fries as received, while at the same time insuring that the resulting product is perfectly satisfactory in all respects.

Numerous other objects and advantages of the invention will be apparent as it is better understood from the following description, which, when taken in connection with the accompanying drawings, discloses a preferred embodiment thereof.

In the drawings:

Figure 1 is a top plan view of a deep fat fryer comprising a preferred physical embodiment of the apparatus of this invention and including an auxiliary container mounted in the fryer well;

Fig. 2 is a perspective view on an enlarged scale of the auxiliary container of Fig. 1;

Fig. 3 is a vertical sectional view, as seen from the right side of the fryer, taken substantially on the line 3—3 of Fig. 1, on a larger scale than the latter, and showing a fry basket mounted in the auxiliary container;

Fig. 4 is a transverse vertical section taken substantially on the line 4—4 of Fig. 1; and Fig. 5 is a detail transverse section through the auxiliary container and the fry basket, showing the latter mounted on the auxiliary container exteriorly thereof and positioned to effect a finish step of final cooking of the potatoes in the grease surrounding the auxiliary container.

Referring more particularly to the drawings, reference numeral 11 indicates in general a deep fat fryer of well-known commercial construction which provides the usual cooking well 12 and preferably includes a suitable heat source therebelow, such as thermostatically controlled burners, indicated in broken lines at 13 in Fig. 1. The front and side walls of the fryer interiorly defining the cooking well 12 preferably are of any suitable double-walled, insulated construction, as shown in Figs. 3 and 4, with the top edge of the front wall defining a downwardly and rearwardly sloping surface 14 shown at the left side of Fig. 3. The rear side of the fryer 11 (seen at the right in Fig. 3) also preferably is of a double-walled construction, but with an outer wall 15 spaced from an inner wall 16 to provide a flue 17 extending upwardly from the space below the well 12 within which the burners 13 are mounted. The upper portion of the inner rear wall 16 slopes rearwardly and terminates in a vertical splash plate 18. A bracket means 19 is attached in any suitable manner to the forward surface of this splash plate 18 and is struck forwardly and upwardly at its bottom and top edges to provide a plurality of laterally spaced bottom clips 21 and top clips 22, for a purpose to be later more fully described.

For use in performing the novel cooking method of this invention, an auxiliary container indicated generally by reference numeral 23 is provided which is illustrated alone in Fig. 2. This auxiliary container 23 is open at its top and preferably is rectangular in shape and of sheet metal construction comprising a bottom wall 24, side walls 25, and front and rear walls 26. These several walls either are formed integrally or secured together in any suitable manner and, to insure a rigid construction, it is preferred that the upper edges thereof be turned over to provide suitable reinforcing top edge flanges.

A handle means 27 is rigidly secured in any suitable manner at its rear end to the front wall 26 and preferably comprises a metal strap or bar, the main body portion of which is angularly disposed relative to the bottom of the auxiliary container 23 at substantially the same angle as that defined by the sloping top edge surface 14 of the front wall of the deep fat fryer and a horizontal plane. It is preferred that the forward end of this handle 27 be reversely bent underneath the main body portion thereof to provide a smooth and clean appearance to the handle and for the purpose of slightly spacing the handle throughout the major portion of its length from the upper sloping surface 14 when the auxiliary container is mounted in operative position in the well 12 in the manner illustrated in Fig. 3.

Hanger means 28, preferably in the form of a substantially U-shaped loop formed from metal rod, is secured at its lower portion to the rear wall 26 of the auxiliary container 23 and extends upwardly and rearwardly therefrom. In the embodiment illustrated in Figs. 2 and 3, this hanger means 28 comprising a U-shaped member has its lower ends bent angularly relative to the major portions of the legs thereof for attachment to the auxiliary container in any desired manner, such as by welding. The transverse portion of this U-shaped member 28 is horizontally disposed for cooperation with the bracket means 19 to assist in supporting the auxiliary container in the desired position in the well of the fryer. In order to provide for a minimum of three points of suspension, it is preferred that this transverse portion of the hanger means 28 be of sufficient width to simultaneously engage with two of either the lower clips 21 or the upper clips 22 of the bracket means 19. When the hanger means 28 engages the lower clips 21 of the bracket means 19 and the handle 27 rests upon the upper sloping top edge of the front wall of the fryer, as illustrated in Fig. 3, the relative dimensioning of the several parts is such that the auxiliary container 23 will be disposed horizontally in the cooking well 12 and partially submerged below the normal level of the cooking fat therein, which is illustrated at 29 in Fig. 3. The several walls of the auxiliary container 23 are provided with a plurality of apertures 31, for a purpose to be later described, which in size and arrangement bear a certain relationship to the size of the auxiliary container. For the present it is sufficient to note that these apertures are disposed in the side and end walls sufficiently close to the bottom wall 24 as to be below the surface 29 of the cooking fat when the auxiliary container 23 is disposed in its operative position of Fig. 3.

Means are provided for receiving the potatoes to be French fried which preferably is in the form of a wire mesh basket 32 having a handle 33. The basket 32 is dimensioned somewhat smaller than the auxiliary container 23 so as to fit therein in the manner illustrated in Fig. 3, although it is considerably deeper than the auxiliary container so as to extend upwardly therefrom. Secured to one side of the basket 32 are auxiliary support means for suspending the basket in the cooking well 12 exteriorly of the auxiliary container 23 and with the lower portion of the basket submerged in the fat. This auxiliary supporting means comprises two or more clips 34 spaced along one side of the basket 32 and so dimensioned that, as shown in Fig. 5, when engaged over the upper edge of an adjacent side wall 25 of the auxiliary container 23, the bottom of the latter and the bottom of the wire basket will be retained in substantially the same horizonal plane. This same shaping and positioning of the clips 34 will result in their engaging over the upper edge portion of the opposite side wall 25 so as not to interfere with positioning of the basket 32 in the auxiliary container 23 as shown in Fig. 3.

As previously noted herein, it is customary to maintain an initial cooking fat temperature range of from 350° to 375° F., to employ such relative dimensioning of the several parts of a commercial deep fat fryer as to provide a volume ratio of potatoes to fat of approximately 1:6, and to fry the potatoes for approximately six minutes. The present invention contemplates a different method of frying the potatoes to overcome the difficulties first enumerated herein, especially when the quantity of potatoes to be cooked is less than the normal capacity of the available equipment. As illustrative of such a situation, the present method contemplates the French frying of potatoes with a volume ratio of potatoes to cooking fat approximately within the range of between 1:2 and 1:4, so as to cause the potatoes to effect reduction of the temperature of the fat approximately 100° F. when initially immersed therein, maintaining the potatoes immersed from five to seven minutes while gradually raising the temperature of the fat approximately 50° F., removing the potatoes, and then immediately immersing the same for approximately one minute in cooking fat having a temperature within the previously noted customary initial range of from 350° to 375° F. This novel method of our invention results in the potatoes being thoroughly cooked throughout and particularly at their center portions during the first phase and then just nicely browned and crisped during the second immersion, without their becoming limp, soggy, or grease-soaked.

To enable the practice of this novel method of French frying potatoes, the previously described and herein illustrated French fryer has the several parts thereof relatively dimensioned within the following ranges. The auxiliary container 23 is so dimensioned that, when it is disposed in its normal operative position of Fig. 3, the ratio of the volume of the submerged portion thereof to the volume of the well 12 up to the surface 29 of the fat is between approximately 1:3 and 1:15. As previously noted, each of the walls of the auxiliary container 23 is provided with apertures 31, and those apertures are so arranged as to result in flow of fat from the well 12 into the interior of the auxiliary container 23 substantially uniformly into all parts of the interior of the auxiliary container. In order to effect the desired rate of return upwards of the cooking fat temperature in the auxiliary container 23 following initial immersion therein of the potatoes to be cooked, the ratio of the total area of these apertures 31 to the area of those portions of the bottom, side, and end walls 24, 25, and 26 of the container which are submerged is between approximately 1:100 and 1:500. In the specific embodiment of the auxiliary container 23 herein illustrated, each end wall 26 has one aperture 31, each side wall 25 has three, and the bottom wall 24 has six of the apertures 31, and each of the latter is in the magnitude of from five thirty-seconds to three eights of an inch in diameter.

With such equipment, the auxiliary container 23 is suspended within the well 12 in the manner illustrated in Figs. 1, 3, and 4 and, by virtue of the small apertures 31, the heated fat within the well 12 will flow into and fill the auxiliary container up to the normal fat level 29. Now, when a short order of potatoes to be French fried is introduced by means of the wire mesh basket 32 into the interior of the auxiliary container 23, as illustrated in Fig. 3, by virtue of the relative dimensioning of the parts previously described, the fat within the auxiliary container 23 will be immediately reduced in temperature approximately 100° F. by the potatoes so immersed from an initial temperature of from 350° to 375° F. It will be understood that the normal preparation of the potatoes before frying is contemplated. The dimensioning of the parts and the arrangement and relative sizes of the apertures 31 are such, as previously described, that maintaining of the potatoes in that cooking position in the auxiliary container 23 for a period of from five to seven minutes will result in the supply of fat within the auxiliary container 23 having its temperature gradually raised approximately 50° from that initial minimum following immersion of the potatoes. It will be appreciated that this results from circulation of the fat from the auxiliary fat supply within the well 12, which is maintained at a substantially constant temperature by the burners 13, through the apertures 31, the fat within the container 23 being constantly frothed and bubbled up by the cooking action to flow over the upper edges thereof. In the meantime, as noted, the auxiliary fat supply in the well 12 exteriorly of the auxiliary container 23 continues to be maintained at a temperature in the normal initial range of from 350° to 375° F. Consequently, if the potatoes are removed from the auxiliary container 23 by merely lifting up on the handle 33 of the wire basket 32 at the end of the desired five to seven minutes initial frying period, and immediately thereafter re-immersed in the auxiliary supply of fat in the well 12 exteriorly of the auxiliary container 23 and retained so immersed for a second or finishing cooking period of approximately one minute, the desired perfect cooking of the short order of potatoes will be effected. During this second or finishing cooking period, the wire mesh basket 32 may be mounted on a side wall of the auxiliary container 23 by means of the supporting brackets 34 in the manner illustrated in Fig. 5. When not in use, the hanger 28 of the auxiliary container 23 may be engaged over the upper clips 22 of the bracket means 19 which will maintain the container above the normal fat level 29 in the well 12, the handle 27 still remaining in contact with the upper wall surface 14 of the fryer. If desired, the basket 32 may be provided with a loop at its rear end that may be engageable with one of the clips 21 or 22 to suspend the wire mesh basket in an inoperative position when not in use.

It is thought that the invention and many of its attendant advantages will be understood from the foregoing description and it will be apparent that various changes may be made in the form, construction, and arrangement of the parts of the apparatus and in the specified ranges used in the method without departing from the spirit and scope of the invention or sacrificing all of its material advantages, the steps and form hereinbefore described being merely a preferred embodiment thereof.

We claim:

1. The method of cooking French fried potatoes which comprises immersing a unit weight of sliced, raw potatoes in from two to four units weight of cooking fat initially heated to from 350° to 375° F. to cause reduction of the temperature of said fat approximately 100° F., maintaining said potatoes immersed for from five to seven minutes while gradually raising the temperature of said fat approximately 50° F., and removing said potatoes and immediately immersing the same for approximately one minute in cooking fat of from 350° to 375° F. temperature.

2. The method of producing French fried potatoes, comprising immersing a unit weight of sliced, raw potatoes in from two to four units weight of cooking fat initially heated to from 350° to 375° F., maintaining circulation for from five to seven minutes between said first supply of fat and an auxiliary fat supply of from three to fifteen times the weight of said first supply heated to from 350° to 375° F., and removing said potatoes and immediately immersing the same for approximately one minute in cooking fat heated from 350° to 375° F.

3. The method of producing French fried potatoes, comprising immersing a unit weight of sliced, raw potatoes in from two to four units weight of cooking fat initially heated to from 350° to 375° F., maintaining circulation for from five to seven minutes between said first supply of fat and an auxiliary fat supply of from three to fifteen times the weight of said first supply heated to from 350° to 375° F., and removing said potatoes and immediately immersing the same in said auxiliary supply of fat for approximately one minute.

4. The method of producing French fried potatoes, comprising immersing a unit weight of sliced, raw potatoes in from two to four units weight of cooking fat initially heated to from 350° to 375° F., maintaining such circulation for from five to seven minutes between said first supply of fat and an auxiliary fat supply of from three to fifteen times the weight of said first supply heated to from 350° to 375° F. as to raise the temperature of said first supply of fat approximately 50° from the 250° to 275° temperature to which it was dropped by the introduction of the potatoes thereto, and removing said potatoes and immediately immersing the same for approximately one minute in cooking fat heated from 350° to 375° F.

5. The method of producing French fried potatoes, comprising immersing a unit weight of sliced, raw potatoes in from two to four units weight of cooking fat initially heated to from 350° to 375° F., maintaining such circulation for from five to seven minutes between said first supply of fat and an auxiliary fat supply of from three to fifteen times the weight of said first supply heated to from 350° to 375° F. as to raise the temperature of said first supply of fat approximately 50° from the 250° to 275° temperature to which it was dropped by the introduction of the potatoes thereto, and removing said potatoes and immediately immersing the same in said auxiliary supply of fat for approximately one minute.

6. A deep fat fryer, comprising a cooking container having a well for fat, an auxiliary container having a limited number of small apertures in the walls thereof below its center and the upper portion of said walls being imperforate, and means for supporting said auxiliary container in said well in spaced relationship thereto and with its upper portion disposed above and adjacent to the surface of a predetermined volume of said fat in said well and its lower portion submerged to dispose said apertures below the surface of said fat, the ratio of the volume of the submerged portion of said auxiliary container to the volume of the well up to the surface of said predetermined fat therein being between approximately 1:3 and 1:15.

7. A deep fat fryer, comprising a cooking container having a well for fat, an auxiliary container having a plurality of small apertures in the bottom and the lower portions of the side walls thereof to enable flow of fat substantially uniformly therethrough into all parts of the interior thereof, means for supporting said auxiliary container in said well in spaced relationship thereto and with its upper portion disposed above and adjacent to the surface of a predetermined volume of fat in said well and its lower portion submerged to position said apertures below the surface of the fat, said upper portion of said auxiliary container being imperforate, a wire food-receiving basket suspended in said auxiliary container and supported thereby, and auxiliary supporting means mounted on said basket for suspending the same in said well exteriorly of said auxiliary container and with the lower portion of the basket submerged in said predetermined volume of fat therein.

8. A deep fat fryer according to claim 7, wherein said auxiliary supporting means comprises clip means engageable with said auxiliary container to retain the bottoms of the latter and the basket in substantially the same plane.

9. A deep fat fryer, compriisng a container for fat having burner means for heating the same, an auxiliary container having a plurality of small apertures in the walls thereof below its center to enable flow of fat substantially uniformly into all parts of the interior of the container when the same is partially submerged below the surface of a predetermined quantity of fat in said container, the upper portions of said walls being imperforate, and supporting means for suspending said auxiliary container in such partially submerged position within said container, the ratio of the total area of said apertures to the area of those portions of said walls which are submerged being between approximately 1:100 and 1:500, and the ratio of the volume of the submerged portion of said auxiliary container to the volume of said container up to the surface of said predetermined volume of fat therein being between approximately 1:3 and 1:15.

10. A deep fat fryer according to claim 9, wherein said supporting means comprises handle means rigidly secured to the forward end of said auxiliary container, hanger means secured to the rear end of said auxiliary container, and bracket means attached to said container for engagement by said hanger means.

11. An auxiliary device for a deep fat fryer, comprising a sheet metal container open at the top and having a plurality of small apertures therein spaced uniformly over the area of the bottom and the lower portions of the upright walls thereof, the upper portions of said upright walls being imperforate, and supporting means secured to said auxiliary container for supporting the same in a deep fat fryer, said auxiliary container being rectangular in shape with each end, side, and bottom, respectively, having no less than one, three, and six of said apertures, and the latter being uniform and in the magnitude of from five thirty-seconds to three-eighths of an inch in diameter.

References Cited in the file of this patent

UNITED STATES PATENTS

| | | |
|---|---|---|
| 1,101,730 | Day | June 30, 1914 |
| 2,207,316 | Ferry | July 9, 1940 |
| 2,286,644 | Pringle et al. | June 16, 1942 |
| 2,546,464 | Martin | Mar. 27, 1951 |
| 2,550,758 | Bemis | May 1, 1951 |
| 2,611,705 | Hendel | Sept. 23, 1952 |
| 2,716,939 | Smith | Sept. 6, 1955 |
| 2,785,277 | Jepson | Mar. 12, 1957 |